(12) United States Patent
Harrelson et al.

(10) Patent No.: US 7,665,377 B2
(45) Date of Patent: Feb. 23, 2010

(54) CONE AND IDLER CONTINUOUSLY VARIABLE TRANSMISSION

(76) Inventors: Steven Harrelson, 25715 Oakridge Forest, Spring, TX (US) 77386; Steven King, 25650 IH-45, Apt. 515, Spring, TX (US) 77386

( * ) Notice: Subject to any disclaimer, the term of this patent is extended or adjusted under 35 U.S.C. 154(b) by 451 days.

(21) Appl. No.: 11/565,975

(22) Filed: Dec. 1, 2006

(65) Prior Publication Data

US 2007/0137341 A1     Jun. 21, 2007

Related U.S. Application Data

(60) Provisional application No. 60/748,792, filed on Dec. 9, 2005.

(51) Int. Cl.
*F16H 3/22* (2006.01)
*F16H 15/16* (2006.01)

(52) U.S. Cl. ........................... 74/349; 476/51

(58) Field of Classification Search ................... 74/339, 74/341, 348, 349; 476/51, 39, 45, 50
See application file for complete search history.

(56) References Cited

U.S. PATENT DOCUMENTS

| 875,962 | A | * | 1/1908 | Stanley | 476/31 |
|---|---|---|---|---|---|
| 1,197,535 | A | * | 9/1916 | O'Donnell | 476/31 |
| 4,459,868 | A | | 7/1984 | Sargent | |
| 4,590,815 | A | | 5/1986 | Sargent | |
| 4,630,495 | A | | 12/1986 | Smith | |
| 4,882,948 | A | | 11/1989 | Brynes, Jr. | |
| 5,681,235 | A | | 10/1997 | Ketcham | |
| 6,055,880 | A | * | 5/2000 | Gogovitza | 74/349 |
| 6,575,856 | B2 | | 6/2003 | Anderson | |
| 6,824,496 | B2 | * | 11/2004 | Mason et al. | 476/51 |
| 6,955,620 | B2 | | 10/2005 | Anderson | |
| 6,997,848 | B1 | | 2/2006 | Cillessen et al. | |
| 7,044,873 | B2 | | 5/2006 | Kuroda et al. | |
| 7,077,780 | B2 | | 7/2006 | Yamamoto | |
| 2004/0092360 | A1 | * | 5/2004 | Semmes | 476/72 |

OTHER PUBLICATIONS

A new spin of Variable Diameter Pulley CVTs [online], Anderson A+ CVT, Retrieved from the Internet:<URL: http://www.andersoncvt.com/applications.html.
How it Works [online], Anderson A+ CVT, Retrieved from the Internet:<URL: http://www.andersoncvt.com/howitworks.html.

(Continued)

*Primary Examiner*—Roger Pang
(74) *Attorney, Agent, or Firm*—Sunstein, Kann, Murphy & Timbers, LLP

(57) ABSTRACT

A continuously variable transmission system comprising an input and output rotational member each with a first circular end and a second circular end is disclosed. The output rotational member is located such that the second circular input member end faces the first output member end and the input and output rotational members share a tangential plane. A first and second idler wheel, attached to an idler shaft, contact the input and output rotational members. The first and second idler wheels and idler shaft are configured to translate rotation from the input rotational member to the output rotational member.

17 Claims, 6 Drawing Sheets

OTHER PUBLICATIONS

W.E. Johns, Notes on Continuously Variable Transmissions [online], 2003, Retrieved from the Internet:<URL: http://www.gizmology.net/cvt.htm.

Continuously variable transmission [online], Sep. 2007, Wikimedia Foundation, Inc. Retrieved from the Internet: <URL: http://en.wilkipedia.org/wiki/Continuously_variable_transmission.

How Automatic Transmissions Work [online], 1998-2007, HowStuffWorks, Inc., Retrieved from the Internet:<URL: http://auto.howstuffworks.com/automatic-transmission.htm.

How CVTs Work [online], 1998-2007, HowStuffWorks, Inc., Retrieved from the Internet:<URL: http://auto.howstuffworks.com/cvt.htm.

* cited by examiner

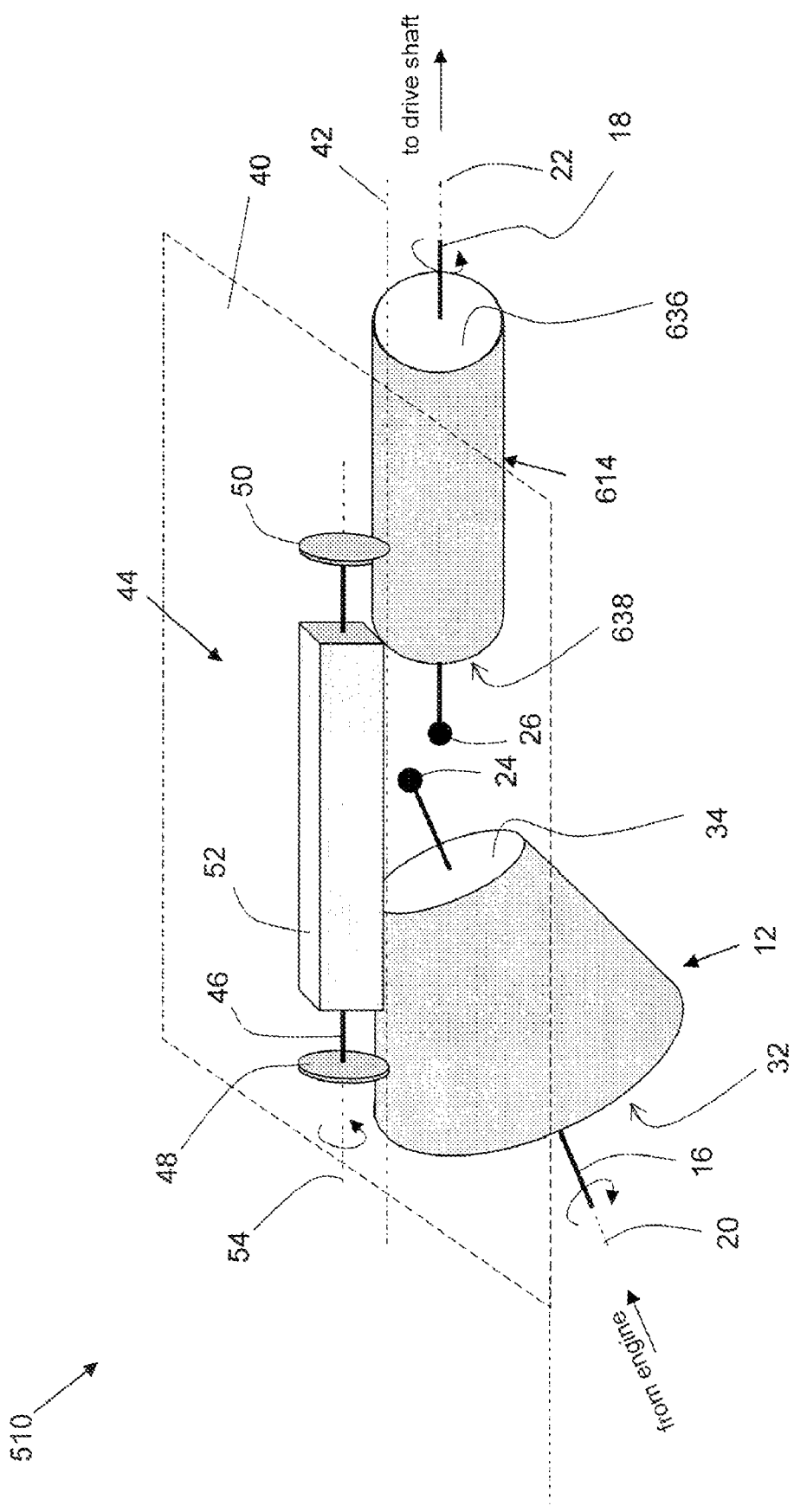

CONE AND IDLER CONTINUOUSLY VARIABLE TRANSMISSION

PRIORITY CLAIM

The preset application claims priority from U.S. Provisional Patent Application 60/748,792, entitled Cone and Idler Continuously Variable Transmission, which was filed Dec. 9, 2005 in the names of Steven Harrelson and Steven King, and is hereby incorporated herein by reference in its entirety.

FIELD OF THE INVENTION

The present invention relates to transmissions for powered vehicles such as automobiles and for machinery in general. In particular, the invention relates to a cone-and-idler frictional type transmission in which input torque and speed may be varied continuously to provide a desired range of output torque and speed.

BACKGROUND OF THE INVENTION

Traditional vehicle transmissions utilizing gears are generally limited to a fixed number of gear ratios. The discrete steps associated with gear changes do not allow for optimal power transfer between the vehicle's engine and the wheels. The torque of an engine is usually constant while driving torque needs vary with speed and load on the engine. Higher torque is applied to driving axles at low speeds, and lower torque is usually applied at higher speeds. Some prior art transmission systems attempt to replace discrete gear transmissions having fixed input/output ratios with various friction, continuous drive arrangements. There are several known types of frictional continuously variable transmissions (CVTs). (Other types of CVTs include electrical CVTs, hydraulic CVTs, and planetary gear systems, all of which are outside of the scope of this disclosure.) One frictional CVT system is a pulley-based system, such as that claimed in U.S. Pat. No. 7,044,873, utilizing two pulleys with inversely variable diameters and a v-belt. The v-belt is kept under tension by pulleys and transfers rotary motion between the pulleys. Another type of prior art system is a toroidal CVT, which utilizes rotating toroidal members and disc rollers. The disc rollers contact the toroidal members thus transferring the rotational momentum between them. Examples of this type of design are offered in U.S. Pat. Nos. 2,164,504 and 7,077,780.

Yet another common type is a so-called 'cone-and-idler' system, schematically presented in FIG. 1 in a dual-cone configuration. The 'cone-and-idler' system comprises a driving cone, a driven cone, and an idler transferring the torque between them. In a conventional 'cone-and-idler' system, driving and driven shafts carry rotationally symmetric and typically equivalent driving and driven cones that are connected to the engine and to the drive axle, respectively. The idler, comprising a wheel on an idler shaft, is disposed between the cones, and the wheel is normal to the cones' outer surfaces and repositionable along the length of the cones while frictionally transmitting torque to effect a ratio change of driving to driven shafts.

Most continuously variable 'cone-and-idler' frictional transmissions require a high level of complexity in torque transmission and control actuation. In the three-body prior art configuration of FIG. 1, for example, mutual positioning of the driving and the driven conical members must assure a constant gap width between the cones. This requirement, in the case of the equivalent cones, imposes a restriction on the position of the respective rotatable shafts, which must be strictly parallel to one another. The idling wheel is typically "wedged" in the gap between the cones. The idling wheel transmits rotation and is movable within the gap along the conical surfaces to change the speed ratio. This configuration offers a wide speed ratio range. However, the overall design is rather complex because measures must be taken to maintain the proper gap width between the cones to accommodate friction among the cones and the idler. Further, the idler and cone-member structures are entangled, which does not allow easy access to and maintenance of the transmission. For example, to merely replace a worn out idler wheel, the entire transmission, including the cone facility, must be dismantled.

Another shortcoming in some of the prior art cone-and-idler traction transmissions is that they utilize multiple torque paths (such as the transmission described in U.S. Pat. No. 4,459,868.) In the process of varying the input/output ratio, all torque paths should be identical in size. If the torque paths are not equivalent, one idler torque path may cause a greater output than the other paths, causing slippage of the idler(s) with respect to the cone(s). A simple version of a cone-and-idler CVT could, therefore, alleviate many of the problems of the prior art designs.

SUMMARY OF THE INVENTION

In accordance with one aspect of the present invention, a continuously variable transmission system is provided. The continuously variable transmission may include an input rotational member with a first circular input member end and a second circular input member end, and an output rotational member with a first circular output end and a second circular output end. The output rotational member may be located such that the second input member end faces the first output member end and the input and output rotational body share a tangential plane. The transmission may also include an idler shaft with a first idler wheel at the first shaft end and a second idler wheel at the second shaft end. The first idler wheel and the second idler wheel may be in contact with the input rotational member and output rotational member, respectively. The idler shaft and first and second idler wheel may be configured to translate rotation of the input rotational member to the output rotational member. The length of the idler shaft may substantially equal to a distance between the first input member end and the first output member end. The first and second idler wheels may be perpendicular to the idler shaft, and may be in perpendicular contact with the input and output rotational members.

In accordance with another aspect of the invention, the input rotational member may be conical such that the first input member end is of a larger diameter than the second input member end. Likewise, the output rotational member may conical such that the second output member end is of a larger diameter than the first output member end. In some embodiments, the input and output members may be either concave or convex.

The input rotational member may connected to an engine of a vehicle such that the rotation of the engine is translated to the input rotational body. The output rotational member may connected to a drive shaft and may be configured to translate rotation to the driveshaft. The transmission may include an idler positioning facility configured to create frictional contact between the idler wheels and the input and output rotational members. The idler positioning facility may translate the idler shaft and first and second idler wheels across the input and output rotational members along the shared tangential, adjusting the ratio of the transferred rotation. Further, the idler shaft may rotatably connected to the idler positioning facility.

In various alternative embodiments, the idler positioning facility may also include a spring loaded positioning mechanism configured to maintain contact between the idler wheels and the input and output rotational members. The spring loaded positioning mechanism may include a bearing plate, a bracket, a spring mechanism, and a track. The bearing plate may be configured to suspend the idler shaft and allow movement in a direction along the longitudinal axis of the input and output rotational member. The bracket may be connected to the idler shaft by a pair of idler bearings on the idler shaft between the first and second idler wheels. The spring mechanism may be connected to the bearing plate and the idler shaft and may be configured to apply force on the idler shaft toward the input and output rotational members to maintain contact between the idler wheels and the input and output rotational members. The bearing plate may be movably connected to the track, which is configured to reposition the idler along the shared tangential.

In other aspects of the present invention, the spring mechanism may also include a servo mechanism for engaging and disengaging the continuously variable transmission. To engage the continuously variable transmission the servo may move the bearing plate, bracket and idler shaft towards the input and output rotational members and create frictional contact between the idler wheels and the input and output rotational members along the shared tangential. The servo mechanism may disengage the continuously variable transmission by moving the bearing plate, bracket and idler shaft away from the input and output rotational members and removing frictional contact between the idler wheels and the input and output rotational members along the shared tangential.

In various alternative embodiments, an idler system for a cone-and-idler continuously variable transmission is provided. The idler system may include an idler shaft having a first end and a second end, a first idler wheel on the first end of the idler shaft, a second idler wheel on the second end of the idler shaft, and an idler positioning facility. The idler positioning facility may be configured to maintain frictional contact between the first and second idler wheels and a driving rotational member and a driven rotational member. The driving rotational member may be connected to an engine output and the driven rotational member may be attached to a drive shaft. The driving and driven rotational members may share a tangential plane. The idler positioning facility may translate the idler shaft and first and second idler wheels across the driving and driven rotational members along the shared tangential.

The idler positioning facility may have a spring loaded positioning mechanism configured to maintain contact between the idler wheels and the driving and driven members. The spring loaded positioning mechanism may have a bearing plate, a bracket, a spring mechanism, and a track. The bearing plate may suspend the idler shaft and allow movement in a direction along the longitudinal axis of the driving and driven rotational members. The bracket may be connected to the idler shaft by a pair of idler bearings disposed on the idler shaft between the first and second idler wheels. The spring mechanism, connected to the bearing plate and the idler shaft, may apply force to the idler shaft in a direction toward the driving and driven rotational members and maintain contact between the idler wheels and driving and driven rotational members. The bearing plate may be moveably connected to the track, which is configured to reposition the idler along the shared tangential.

The spring mechanism may also have a servo for engaging and disengaging the transmission. To engage the continuously variable transmission, the servo may move the bearing plate, bracket and idler shaft towards the driving and driven rotational members and, thus, create frictional contact between the idler wheels and the driving and driven rotational members such that the idler wheels are perpendicular to the shared tangential. To disengage the continuously variable transmission, the servo may move the bearing plate, bracket and idler shaft away from the driving and driven rotational members and, thus, remove frictional contact between the idler wheels and the driving and driven rotational members.

In accordance with another aspect of the present invention, a method for transmitting torque and rotation in a continuously variable transmission is provided. The method may include connecting a driving rotational cone to an output shaft of a motor, connecting a driven rotational cone to a drive shaft, and engaging a continuously variable transmission. The driving and driven rotational cones may share a tangential plane, and one end of the driving rotational cone may face one end of the driven rotational cone. The transmission may be engaged by applying a force to an idler shaft containing a first and second idler wheel such that the first idler wheel contacts the driving rotational cone at the shared tangential and the second idler wheel contact the driven rotational cone at the shared tangential. The idler shaft can be translated along the shared tangential such that the idler wheels contact the driving and driving rotational cones at varying diameters, thus, changing the speed ratio of the continuously variable transmission. The speed ratio may be increased by translating the idler shaft such that the first idler wheel contacts a larger diameter on the driving rotational cone and the second idler wheel contacts a smaller diameter on the driven rotational cone. The speed ration may be decreased by translating the idler shaft such that the first idler wheel contact a smaller diameter of the driving rotational cone and the second idler wheel contacts a larger diameter on the driven rotational cone

BRIEF DESCRIPTION OF THE DRAWINGS

The foregoing features of the invention will be more readily understood by reference to the following detailed description, taken with reference to the accompanying drawings, in which:

FIG. 6 schematically illustrates another alternative embodiment of the present invention in which one of the rotational members is cylindrical.

DETAILED DESCRIPTION OF THE
EMBODIMENTS OF THE INVENTION

In embodiments of the present invention, a cone-and-idler continuously variable transmission (CVT) is used to adjust the ratio of torque and speed transmitted from an engine to the wheels of a vehicle. The CVT system may be configured in two spatially separate, structurally uncoupled and disentangled functional layers. The layers are positioned adjoining one another and come into operational contact only when the CVT is engaged. The first structural layer contains a driving (input) and a driven (output) rotational member and associated peripheral and supporting constructions. The second structural layer contains an idling facility for transferring rotary motion between the driving and the driven rotational members. The driving member and driven members may be connected to an engine and a driveshaft (or axle), respectively. Rotation from the engine output is passed to the driving member, through the idling facility, and to the driven member, which passes the rotation and torque to the driveshaft and wheels of a car. The speed and torque ratio may be adjusted by changing the points at which the idling facility makes contact with the driving and driven members.

Figure 1:
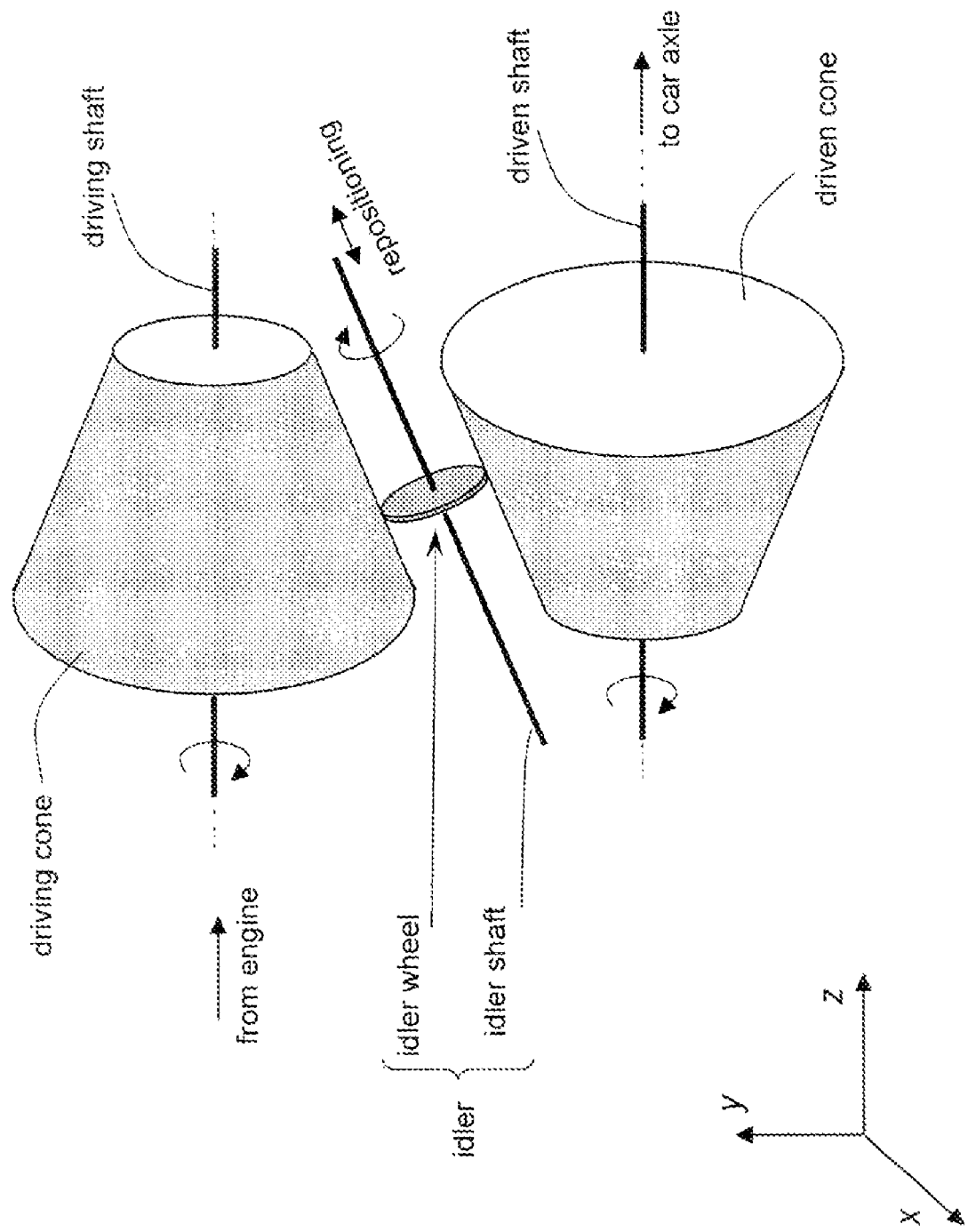
FIG. 1 is a perspective view of a prior art cone-and-idler CVT.
Figure 2:
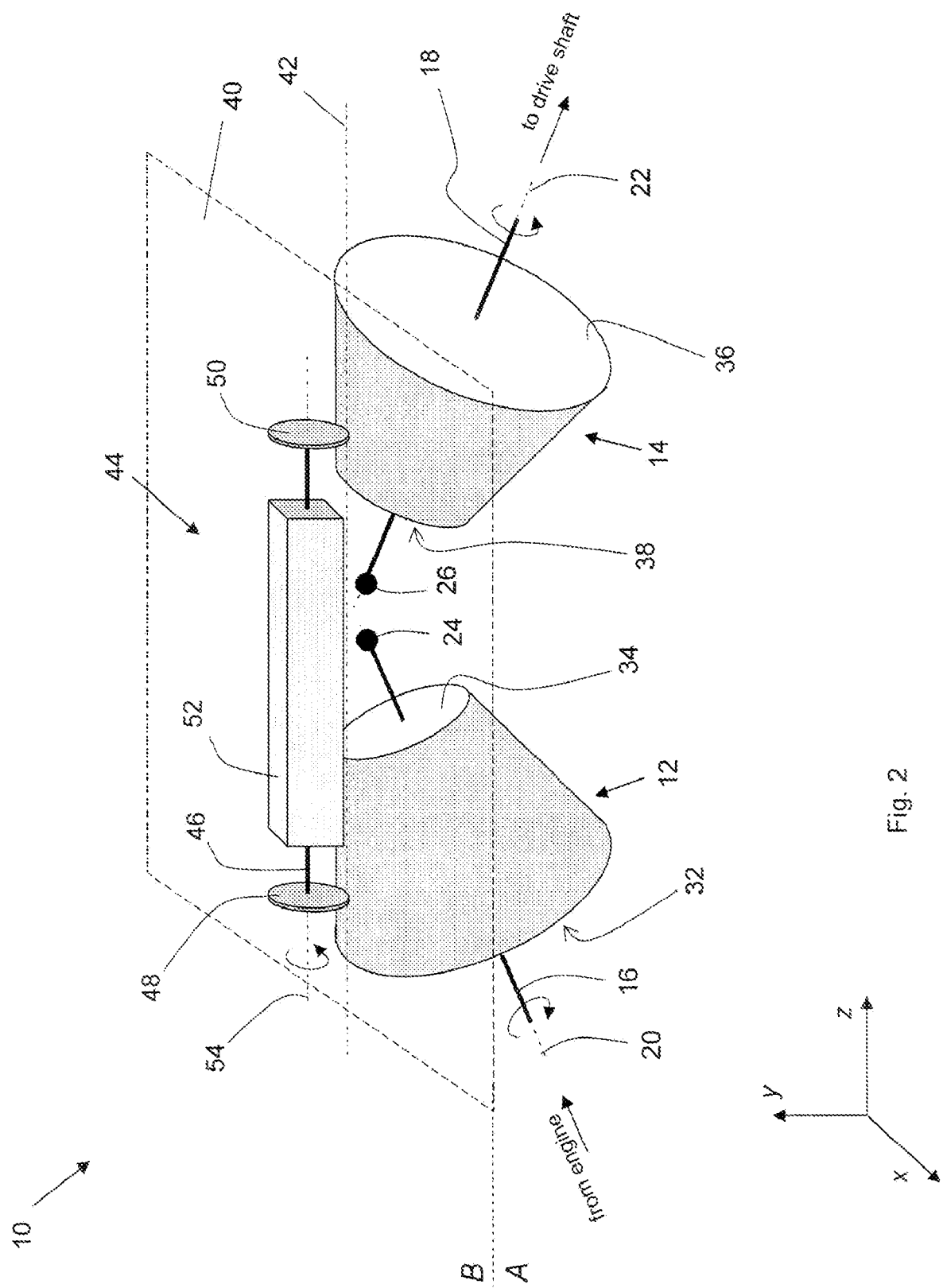
FIG. 2 is a perspective view of a cone-and-idler CVT in accordance with an embodiment of the present invention.
Figure 3:
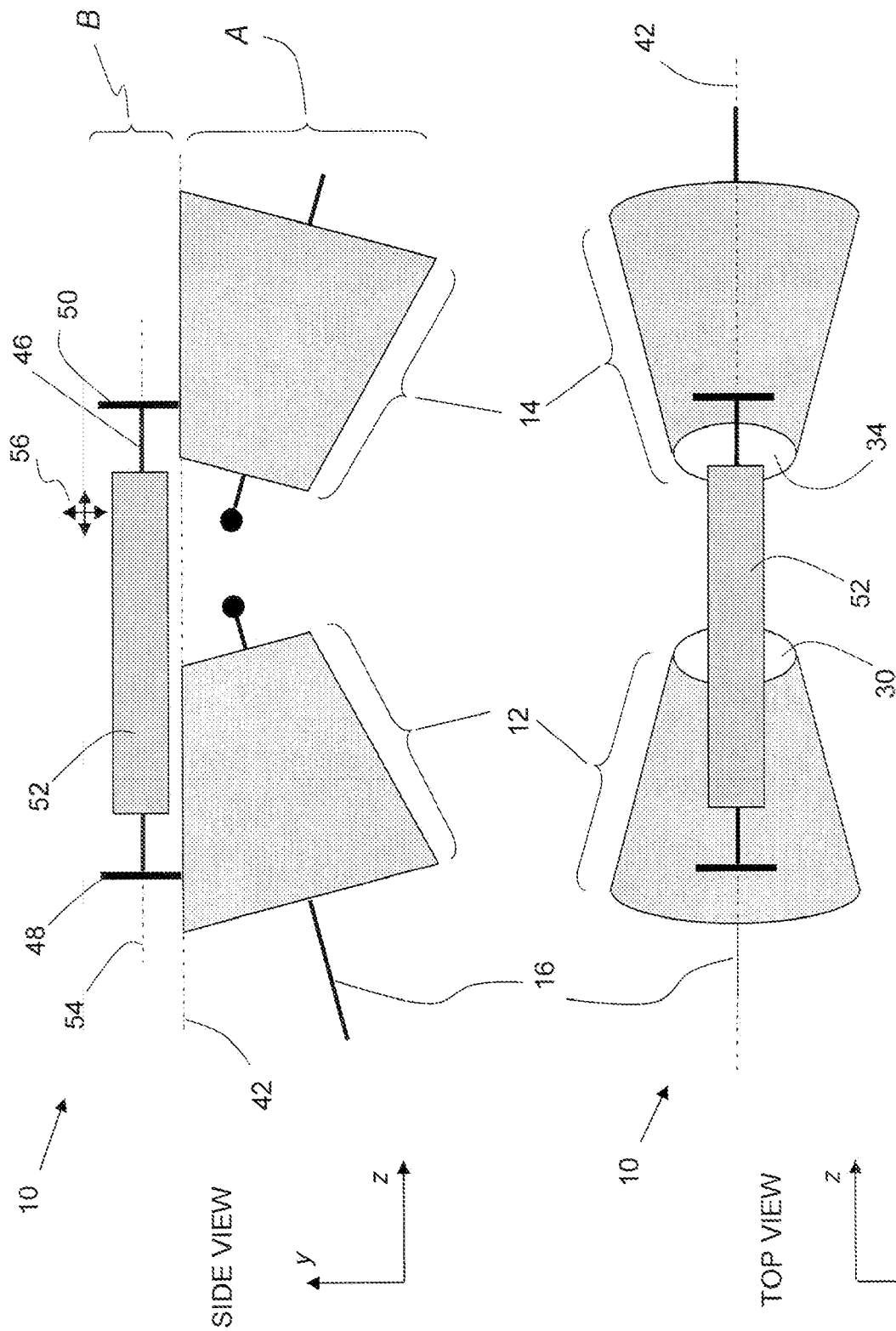
FIG. 3 provides schematically side and top views of the cone-and-idler CVT of FIG. 2.

A preferred embodiment of the invention is described with reference to FIGS. 2 and 3. FIGS. 2 and 3 schematically show a continuously variable transmission (CVT) 10 configured in accordance with embodiments of the invention. The CVT 10 is structured as a two-layer mechanism, and provides a simple frictional transmission for continuously varying input/output ratios of torque and speed. The first layer A of the transmission 10 includes two rotational members—a driving member 12 (the input member) and a driven member 14 (the output member)—on corresponding driving and driven longitudinal shafts 16,18, which may be connected to an engine output and a driveshaft, respectively. The engine output transfers rotation and torque to the driving member 16, which ultimately passes the rotation and torque to the driven member 18.

The driving and driven shafts 16,18 are coaxial with and rotatable about axes of rotation 20,22 and carry bearings 24,26 braced to a supporting structure (not shown). In the preferred embodiment, the rotational members 12,14 are equivalent solid conical frustums with ends 32,34, 36, 38 that are base circles perpendicular to the corresponding axes of rotation 20,22. The conical shape of the rotational members 12, 14 provide a wide range of speed and torque ratios. The term "frustum" refers to a portion of a solid which lies between two parallel planes cutting the solid. The rotational members 12,14 are detached from each other and are positioned with their smaller base circles 34,38 toward one another in such a fashion as to share a common tangential plane 40, shown in FIG. 2 (for illustration purposes only). As shown in FIG. 2, the common tangential plane 40 is parallel to the xz-plane and touches the rotational members 12, 14 along a straight line 42. In the preferred embodiment, therefore, both rotational members 12,14 are located on the same side of the common tangential plane 40, and the shafts 16,18 lie non-collinearly in a plane that is perpendicular to the plane 40 and intersects it along the line 42. The terms "non-collinear" and "non-collinearly" refer to straight lines that neither coincide nor are parallel. Such configuration, as would be understood by one skilled in the art, allows localizing the rotational members 12, 14 and all associated power and rotational facilities (not shown) in a separate structural layer A of the CVT 10.

The second structural layer B of CVT 10 is adjacent to the layer A along the common tangential plane 40 and incorporates an idler 44 for transferring rotation between the rotational members. The idler 44 includes an idler shaft 46 and a pair of idler wheels 48,50 rigidly connected at either end of the idler shaft 46. The idler wheels 48, 50 contact the rotational members 12, 14 at a diameter along the line 42. Therefore, as the driving member 12 rotates from the engine output, the rotation is passed through the idler 44 and idler wheels 48, 50 to the driven member 14 and driveshaft. The idler 44 may also include an idler-positioning facility 52, which positions the idler 44 along the rotational members. The idler shaft 46 is coaxial with and rotatable about an axis 54 and parallel to the linear tangent 42. In the preferred embodiment, the length of the idler shaft 46 is substantially equal to the distance between the outer (bigger) base circle 32 of the driving member 12 to the inner (smaller) base circle 38 of the driven member 14, measured along the line 42.

The role of the idler-positioning facility 52 is two-fold. First, the idler-positioning facility 52 assures frictional contact between the idler wheels 48,50 and the rotational members 12,14 so that torque and rotation are transmitted between the rotational members 12,14. The idler-positioning facility 52 also slides the idler 44 along the line 42 in order to effect a continuous speed-ratio change between the driving and the driven shafts. Second, the idler-positioning facility 52 is adapted to allow an easily accessible, operative communication between layers A and B of the CVT 10 as indicated by the arrows 56 of FIG. 3. The idler-positioning facility 52 may utilize, for example, a spring-loaded apparatus to separate the layers or bring the layers in immediate proximity of one another. Allowing the separation of the layers simplifies technical maintenance of the CVT 10 by disentangling the components. For instance, if an operator needs to replace one or both of the idler wheels 48, 50, they may do so without disturbing the rotational members 12, 14.

In operation, the driving wheel 48 contacts the driving member 12 and the driven wheel 50 contacts the driven member 14, thus transferring power from the engine (not shown) to the car axle (not shown). The idler shaft 46 moves back and forth along the rotational members 12,14, changing the positions at which the idler wheels 48,50 make contact with the rotational members 12,14 along the linear tangent 42. It would be readily understood by one skilled in the art that the speed-transfer ratio of the CVT 10 is defined by the ratio of the radius of the driving member's 12 cross-section, which is perpendicular to the axis of rotation 20 at a point of contact with the driving idler wheel 48, to the radius of corresponding the driven member's 14 cross-section at a point of contact with the driven idler wheel 50. For example, in the preferred embodiment, when the driving idler wheel 48 contacts the driving member 12 at the larger base circle 32, the driven idler wheel 50 must contact the driven member 14 at the smaller base circle 38. Then, if the driving member 12 and the driven member 14 are equivalent and have large base circles 32,36 of 3 inches and small base circles 34,38 of 1 inch, the speed-transfer ratio would be 1:3 for the above described contact points. In other words, for each rotation of the driving member 12, the driven member 14 will rotate three times.

Figure 4:
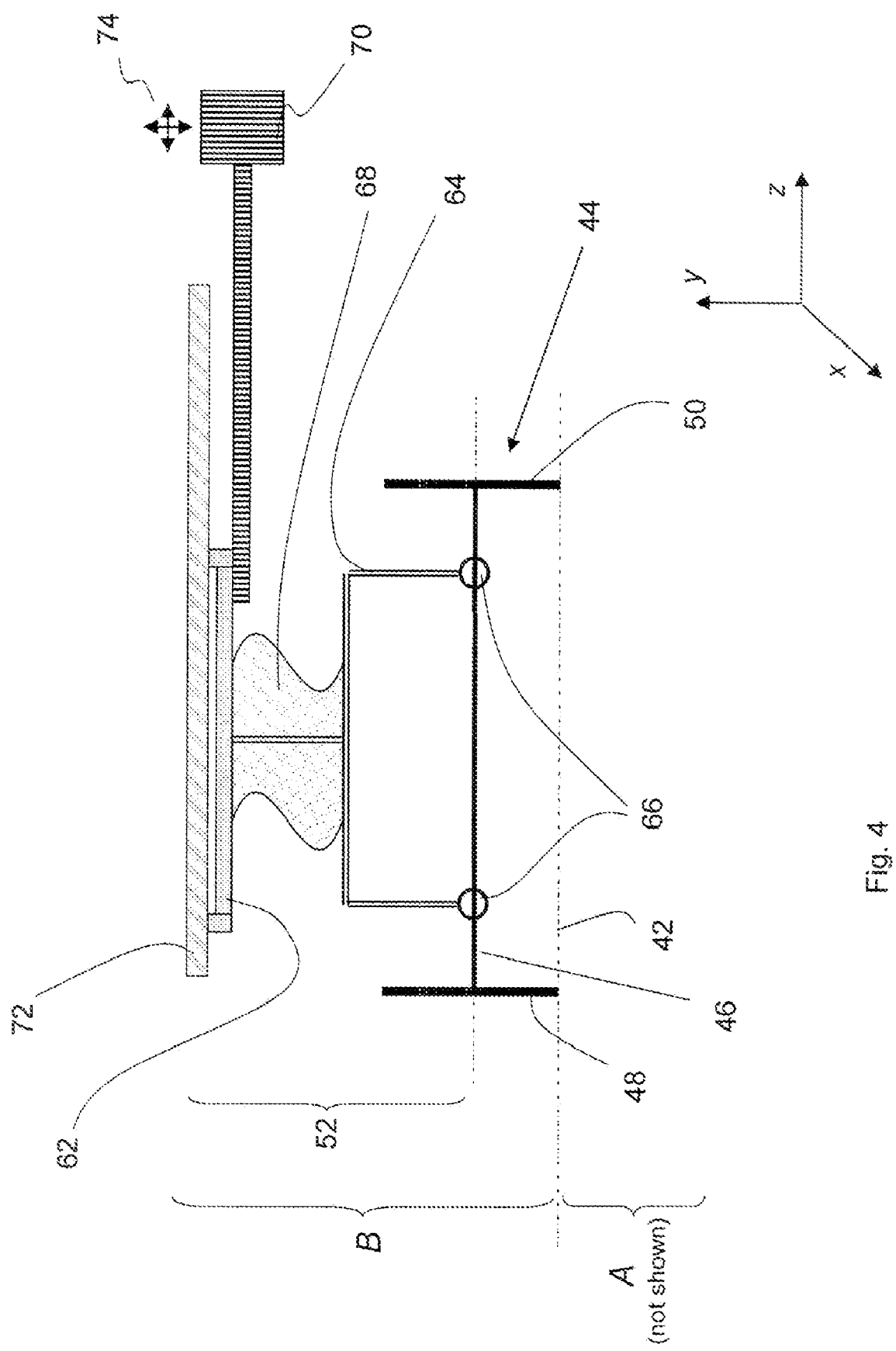
FIG. 4 schematically illustrates the idler-repositioning facility in accordance with the preferred embodiment of the invention.

A preferred embodiment of the idler-repositioning facility 52 of FIG. 2 is schematically shown in FIG. 4 with reference to FIG. 2. Here, a bearing plate 62, suspending the idler 44, is operatively connected to the idler 44 through a bracket 64. The bracket 64 is attached to the idler 44 via a pair of bearings 66 disposed on the idler shaft 46 between the idler wheels 48,50, and is used to ultimately connect the idler 44 to the idler-repositioning facility 52. The bearing plate 62 is appropriately affixed to the spring-loaded apparatus 68, which is configured to transfer force vertically, in a −y direction and create frictional contact between the idler 44 and the rotational members 12,14. In operation, a servo mechanism 70 (equipped, for example, with hydraulic cylinders or other repositioning means adapted to operate under pressure) may move the bearing plate 62, the bracket 64, and the connected idler 44 toward the rotational members 12,14 until frictional contact between the idler wheels 48,50 and the rotational members 12,14 is established along the line 42. The spring-loaded apparatus 68 applies pressure to the idler 44 to maintain the frictional contact at a level suitable for CVT operation. To disengage the idler 44 from the rotational members 12,14, the servo 70 operates to move the bearing plate 62 in the opposite, +y direction, thus pulling the idler 44 away from the rotational members 12,14 by the bracket 64. The repositioning of the idler 44 along the line 42, required to change the torque and the speed transferred between the rotational members 12,14, is achieved by moving the bearing plate 62 along a track 72 in the xz-plane shown in FIG. 4. The servo 70 may be configured to provide the idler-repositioning facility 52 with several degrees of mobility as indicated by the arrows 74.

When the CVT 10 is not engaged, there is no contact between the idler wheels 48,50 and the rotational members 12,14. Such an orientation allows for easy maintenance of the CVT 10. The rotational bodies 12,14 or the idler 44 and the wheels 48,50 may be replaced easily without major interference from the other components. Additionally, once the parts are replaced or repaired, there is no need to re-orient/reassemble the rotational members 12,14 and idler 44 to a specific gap width. Rather, the idler positioning facility 52 will move the idler 44 and the idler wheels 48,50 into position when the CVT is engaged.

Figure 5:
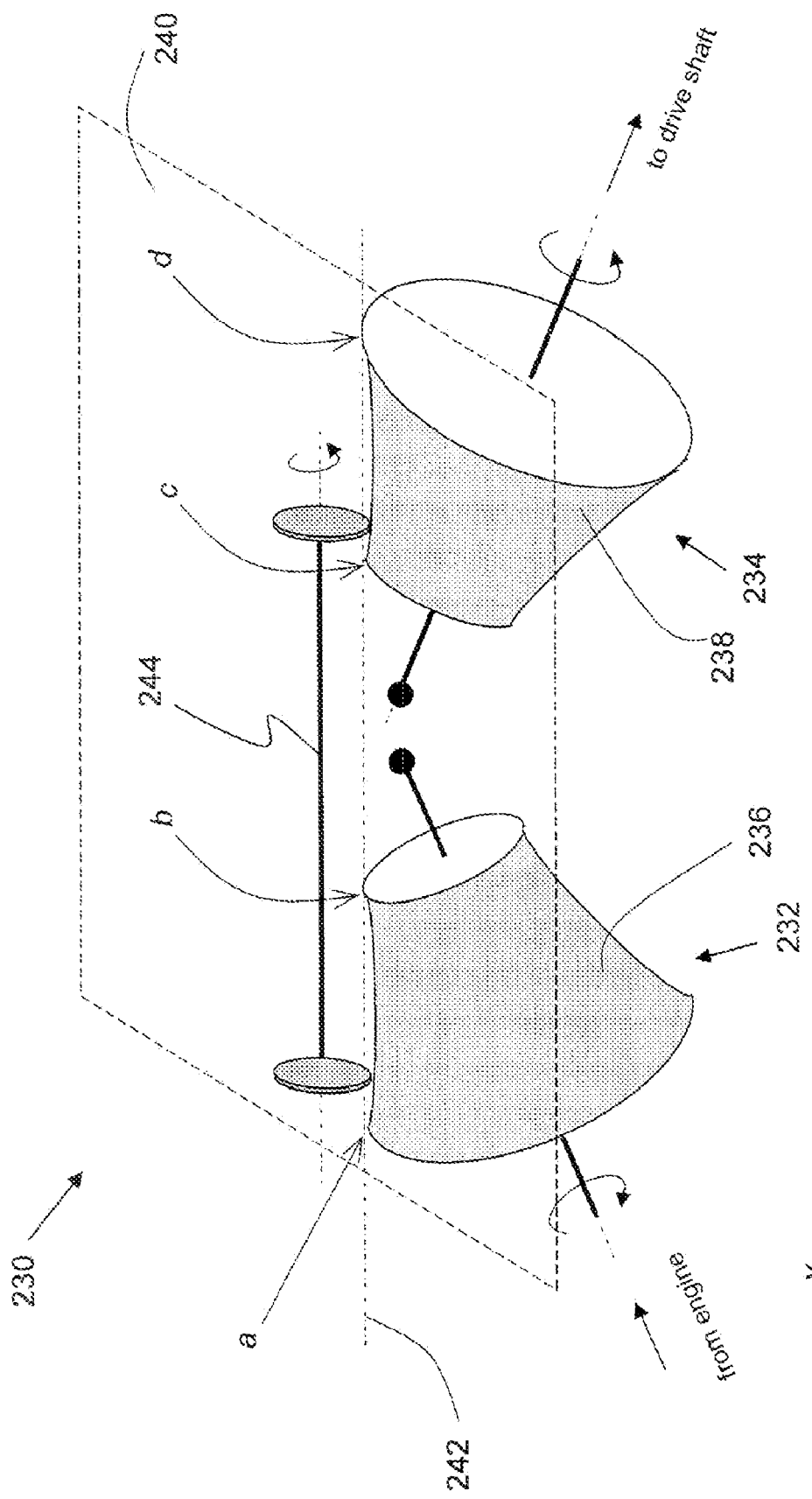
FIG. 5 schematically illustrates an alternative embodiment of the present invention in which the rotational members have a concave surface.

The above discussion discloses exemplary embodiments of the invention, and it would be apparent that those skilled in the art can make various modifications that will achieve some of the advantages of the invention without departing from the true scope of the invention. For example, the rotational members may have either convex- or concave-shaped outer surfaces. An alternative embodiment 230, wherein the conical rotational members 232,234 have slightly concave outer surfaces 236,238, is shown in FIG. 5. The operation of the alternative embodiment 230 requires that two conditions be satisfied. First, the rotational members 232,234 must be in contact with a common plane 240, which passes through both ends of each the rotational member 232,234 (i.e., points a, b, c, and d, which lie on the same straight line 242). Also, the idler shaft 244 must be oriented parallel to the line 242. In such a configuration, the non-collinear axes of rotation of the rotational members 232,234 lie in the same plane (not shown) that is perpendicular to the plane 240 and intersects it along a straight line 242.

Additionally, the generally conical rotational members 12,14 of FIG. 2 do not have to be conical frusta. For example, the members 12,14 may be complete cones ending in points, and facing each other with their apexes. Alternatively, the mutual orientation of the members may be reversed, wherein the bigger ending formations are positioned toward each other and the smaller ending formations are disposed away from one another.

As shown in FIG. 6, in an additional alternative embodiment of the present invention, one of the rotational members may have a cylindrical shape 614. In this embodiment, the smaller diameter circular end 34 of the rotational member 12 faces a circular end 638 of the cylindrical rotational member 614. However, it is important to note that the larger diameter circular end 32 may also face the cylindrical rotational member 614. The speed transfer ratio will always be a ratio of the diameter at which the driven idler wheel 50 contacts the driven member 614 to the diameter at which the driving idler wheel 48 contacts the driving member 612. For example, if the driving rotational member 12 is conical with a larger base circle of 3" and a smaller base circle of 1" and the driven rotational member is a cylinder 614 with a diameter of 1", the speed ratio will be 1:3 when the driving idler wheel 48 contacts the driving member 14 at the larger base circle 32. Therefore, for every rotation of the driving rotational body (cone) 12, the driven rotational body (cylinder) 614 will rotate three times. As the idler 44 translates over the surface of the rotational members 12, 614, the ratio will continue to decrease to a lower limit of 1:1, where the driving idler wheel 48 contacts the driving member 12 at the smaller base circle 634. Conversely, if the driving member is cylindrical with a base circle of 1" and the driven member is conical with a large base circle of 3" and a small base circle of 1", the speed ratio will be 1:1 when the driven idler wheel 50 contacts the driven member at the smaller base circle. As the idler 44 translates over the rotational members, the speed ratio will increase to 3:1 when the driven wheel contacts the driven member at the large base circle. Therefore, for every three rotations of the driving member, the driven member will rotate once.

Although the present invention has been shown and described in terms of specific preferred embodiments, it will be appreciated by those skilled in the art that changes or modifications are possible which do not depart from the inventive concepts described and taught herein. Such changes and modifications are deemed to fall within the purview of these inventive concepts. Any combination of the various features of the preferred embodiments are deemed to fall within the purview of these inventive concepts.

What is claimed is:

1. A continuously variable transmission system comprising:
   an input rotational member comprising a first circular input member end and a second circular input member end;
   an output rotational member comprising a first circular output member end and a second circular output member end, wherein the output rotational member is located such that the second input member end faces the first output member end, the first circular input member end, second circular input member end, first circular output member end and second circular output member end sharing a tangential plane;
   an idler shaft comprising a first shaft end and a second shaft end;
   a first idler wheel located on the idler shaft at the first shaft end, and in contact with the input rotational member; and
   a second idler wheel located on the idler shaft at the second shaft end, and in contact with the output rotational member and wherein the idler shaft and first and second idler wheels are configured to translate rotation of the input rotational member to the output rotational member.

2. The continuously variable transmission of claim 1, wherein the input rotational member is conical such that the first input member end is of a larger diameter than the second input member end.

3. The continuously variable transmission of claim 1, wherein the output rotational member is conical such that the second output member end is of a larger diameter than the first output member end.

4. The idler shaft of claim 1, wherein a length of the idler shaft is substantially equal to a distance between the first input member end and the first output member end.

5. The continuously variable transmission of claim 1, wherein
   the input rotational member is connected to an engine of a vehicle such that the rotation of the engine is translated to the input rotational member; and
   the output rotational member is connected to a drive shaft and is configured to translate rotation to the driveshaft.

6. The continuously variable transmission of claim 1 further comprising an idler positioning facility configured to create frictional contact between the idler wheels and the input and output rotational members and translate the idler shaft and first and second idler wheels across the input and output rotational members along the shared tangential, wherein the idler shaft is rotatably connected to the idler positioning facility.

7. The continuously variable transmission of claim 1, wherein the input and output rotational members have a convex-shaped outer surface.

8. The continuously variable transmission of claim 1, wherein the input and output rotational members have a concave-shaped outer surface.

9. The continuously variable transmission of claim 1, wherein the first and second idler wheels are perpendicular to the idler shaft, and are in perpendicular contact with the input and output rotational members.

10. A continuously variable transmission system comprising:
   an input rotational member comprising a first circular input member end and a second circular input member end;
   an output rotational member comprising a first circular output member end and a second circular output member end, wherein the output rotational member is located such that the second input member end faces the first output member end and the input and output rotational members share a tangential plane;
   an idler shaft comprising a first shaft end and a second shaft end:
   a first idler wheel located on the idler shaft at the first shaft end, and in contact with the input rotational member:
   a second idler wheel located on the idler shaft at the second shaft end, and in contact with the output rotational member and wherein the idler shaft and first and second idler wheels are configured to translate rotation of the input rotational member to the output rotational member; and
   an idler positioning facility configured to create frictional contact between the idler wheels and the input and output rotational members and translate the idler shaft and first and second idler wheels across the input and output rotational members along the shared tangential, wherein the idler shaft is rotatably connected to the idler positioning facility, wherein the idler positioning facility further comprises:
   a spring loaded positioning mechanism configured to maintain contact between the idler wheels and the input and output rotational members.

11. The continuously variable transmission of claim 10, wherein the spring loaded positioning mechanism further comprises:
   a bearing plate configured to suspend the idler shaft and configured to allow movement in a direction along the longitudinal axis of the input and output rotational members;
   a bracket connected to the idler shaft by a pair of idler bearings disposed on the idler shaft, wherein the idler bearings are located between the first and second idler wheels;
   a spring mechanism connected to the bearing plate and the idler shaft and configured to apply force on the idler shaft toward the input and output rotational members and maintain contact between the idler wheels and the input and output rotational members; and
   a track, wherein the bearing plate is movably connected to the track and is configured to reposition the idler along the shared tangential.

12. The continuously variable transmission of claim 11, wherein the spring mechanism further comprises
   a servo mechanism configured engage the continuously variable transmission by moving the bearing plate, bracket and idler shaft towards the input and output rotational members and creating frictional contact between the idler wheels and the input and output rotational members along the shared tangential, and disengage the continuously variable transmission by moving the bearing plate, bracket and idler shaft away from the input and output rotational members and removing frictional contact between the idler wheels and the input and output rotational members along the shared tangential.

13. An idler system for a cone-and-idler continuously variable transmission, the system comprising:
   an idler shaft having a first end and a second end;
   a first idler wheel on the first end of the idler shaft;
   a second idler wheel on the second end of the idler shaft; and
   an idler positioning facility configured to maintain frictional contact between the first and second idler wheels and a driving rotational member having a first circular input end and a first circular output end and a driven rotational member having a second circular input end and a second circular output end, wherein the driving rotational member is connected to an engine output and the driven rotational member is attached to a drive shaft and the first circular input end, second circular input end, first circular output end and second circular output end share a tangential plane.

14. The idler system according to claim 13, wherein the idler positioning facility is further configured to translate the idler shaft and first and second idler wheels across the driving and driven rotational members along the shared tangential.

15. The idler system of claim 14, wherein the idler positioning facility further comprises a spring loaded positioning mechanism configured to maintain contact between the idler wheels and the driving and driven members.

16. The idler system of claim 15, wherein the spring loaded positioning mechanism further comprises:
   a bearing plate configured to suspend the idler shaft and configured to allow movement in a direction along the longitudinal axis of the driving and driven rotational members;
   a bracket connected to the idler shaft by a pair of idler bearings disposed on the idler shaft, wherein the idler bearings are located between the first and second idler wheels;
   a spring mechanism connected to the bearing plate and the idler shaft and configured to apply force to the idler shaft in a direction toward the driving and driven rotational members and maintain contact between the idler wheels and driving and driven rotational members; and
   a track, wherein the bearing plate is moveably connected to the track and is configured to reposition the idler along the shared tangential.

17. The idler system of claim 16, wherein the spring mechanism further comprises:
   a servo mechanism configured to engage a continuously variable transmission by moving the bearing plate, bracket and idler shaft towards the driving and driven rotational members and creating frictional contact between the idler wheels and the driving and driven rotational members such that the idler wheels are perpendicular to the shared tangential, and disengage a continuously variable transmission by moving the bearing plate, bracket and idler shaft away from the driving and driven rotational members and removing frictional contact between the idler wheels and the driving and driven rotational members.

* * * * *